United States Patent
Gasthaus et al.

(10) Patent No.: US 11,531,917 B1
(45) Date of Patent: Dec. 20, 2022

(54) PROBABILISTIC FORECASTING WITH NONPARAMETRIC QUANTILE FUNCTIONS

(71) Applicant: Amazon Technologies, Inc., Seattle, WA (US)

(72) Inventors: Jan Gasthaus, Munich (DE); Konstantinos Benidis, Berlin (DE); Yuyang Wang, Belmont, CA (US); David Salinas, Berlin (DE); Valentin Flunkert, Berlin (DE)

(73) Assignee: Amazon Technologies, Inc., Seattle, WA (US)

(*) Notice: Subject to any disclaimer, the term of this patent is extended or adjusted under 35 U.S.C. 154(b) by 866 days.

(21) Appl. No.: 16/147,147

(22) Filed: Sep. 28, 2018

(51) Int. Cl.
*G06N 3/08* (2006.01)
*G06N 7/00* (2006.01)

(52) U.S. Cl.
CPC ............... *G06N 7/005* (2013.01); *G06N 3/08* (2013.01)

(58) Field of Classification Search
CPC .................................. G06N 7/005; G06N 3/08
See application file for complete search history.

(56) References Cited

U.S. PATENT DOCUMENTS

| | | | |
|---|---|---|---|
| 8,499,066 B1* | 7/2013 | Zhang ................. | H04L 47/823 709/223 |
| 9,860,303 B1* | 1/2018 | Vicaire ............... | H04L 67/1012 |
| 10,635,650 B1* | 4/2020 | Chud .................. | G06F 16/2282 |
| 2019/0114538 A1* | 4/2019 | Ng ....................... | G06N 3/063 |

OTHER PUBLICATIONS

Flunkert, V., Salinas, D., Gasthaus, J., DeepAR: Probabilistic forecasting with autoregressive recurrent networks. Apr. 13, 2017 arXiv:1704.04110 (Year: 2017).*
Wen, R., Torkkola, K., Narayanaswamy, B. and Madeka, D.,Jun. 28, 2018. A multi-horizon quantile recurrent forecaster. arXiv preprint arXiv:1711.11053v2. (Year: 2018).*
Grantham, A., Gel, Y.R. and Boland, J., 2016. Nonparametric short-term probabilistic forecasting for solar radiation. Solar Energy, 133, pp. 465-475. (Year: 2016).*
Laube, P., Franz, M.O. and Umlauf, G., Jul. 22, 2018, Deep learning parametrization for b-spline curve approximation. arXiv:1807. 08304 (Year: 2018).*

(Continued)

*Primary Examiner* — Michael J Huntley
*Assistant Examiner* — Sung W Lee
(74) *Attorney, Agent, or Firm* — Nicholson De Vos Webster & Elliot LLP

(57) ABSTRACT

Techniques are described for a time series probabilistic forecasting framework that combines recurrent neural networks (RNNs) with a flexible, nonparametric representation of the output distribution. The representation is based on the nonparametric quantile function (instead of, for example, a parametric density function) and is trained by minimizing a continuous ranked probability score (CRPS) derived from the quantile function. Unlike methods based on parametric probability density functions and maximum likelihood estimation, the techniques described herein can flexibly adapt to different output distributions without manual intervention. Furthermore, the nonparametric nature of the quantile function provides a significant boost in the approach's robustness, making it more readily applicable to a wide variety of time series datasets.

20 Claims, 10 Drawing Sheets

(56) References Cited

OTHER PUBLICATIONS

Flunkert V., et al., "DeepAR: Probabilistic Forecasting with Autoregressive Recurrent Networks," 34th International Conference on Machine Learning, Version 1, retrieved from https://arxiv.org/abs/1704.04110v1, Apr. 13, 2017, 11 pages.
Gneiting T., et al., "Calibrated Probabilistic Forecasting Using Ensemble Model Output Statistics and Minimum CRPS Estimation," Monthly Weather Review, vol. 133, No. 5, May 2005, pp. 1098-1118.
Gneiting T., et al., "Strictly Proper Scoring Rules, Prediction, and Estimation," Journal of the American Statistical Association, vol. 102, No. 477, Mar. 2007, pp. 359-378.
Graves A., "Generating Sequences With Recurrent Neural Networks," 2013, Version 5, retrieved from https://arxiv.org/abs/1308.0850v5. Revised on Jun. 5, 2014, 43 pages.
Hersbach H., "Decomposition of the Continuous Ranked Probability Score for Ensemble Prediction Systems," Weather and Forecasting, vol. 15, No. 5, Oct. 2000, pp. 559-570.
Sutskever I., et al., "Sequence to Sequence Learning with Neural Networks," NIPS'14 Proceedings of the 27th International Conference on Neural Information Processing Systems, vol. 2, 2014, pp. 3104-3112.
Wen R., et al., "A Multi-Horizon Quantile Recurrent Forecaster," 31st Conference on Neural Information Processing Systems (NIPS 2017), Version 2, retrieved from https://arxiv.org/abs/1711.11053v2, Revised on Jun. 28, 2018, 9 pages.

\* cited by examiner

PROBABILISTIC FORECASTING WITH NONPARAMETRIC QUANTILE FUNCTIONS

BACKGROUND

The probabilistic forecasting of time series data has become an important aspect of decision making and planning in modern businesses. However, the rapid growth of time series data from many different sources poses many challenges for traditional forecasting models. Classical time series forecasting techniques, for example, are well-suited for capturing the uncertainty of a small group of time series but they often struggle with forecasting more complex data sets. Neural network-based methods have therefore recently received revived interest in forecasting because of their abilities to address these short-comings by extracting patterns across a large number of time series. However, existing neural network-based approaches for forecasting often make inaccurate assumptions about a distribution of the underlying data that cause the resulting probability distributions to be less accurate than desired.

BRIEF DESCRIPTION OF DRAWINGS

Various embodiments in accordance with the present disclosure will be described with reference to the drawings, in which.

DETAILED DESCRIPTION

Figure 1:
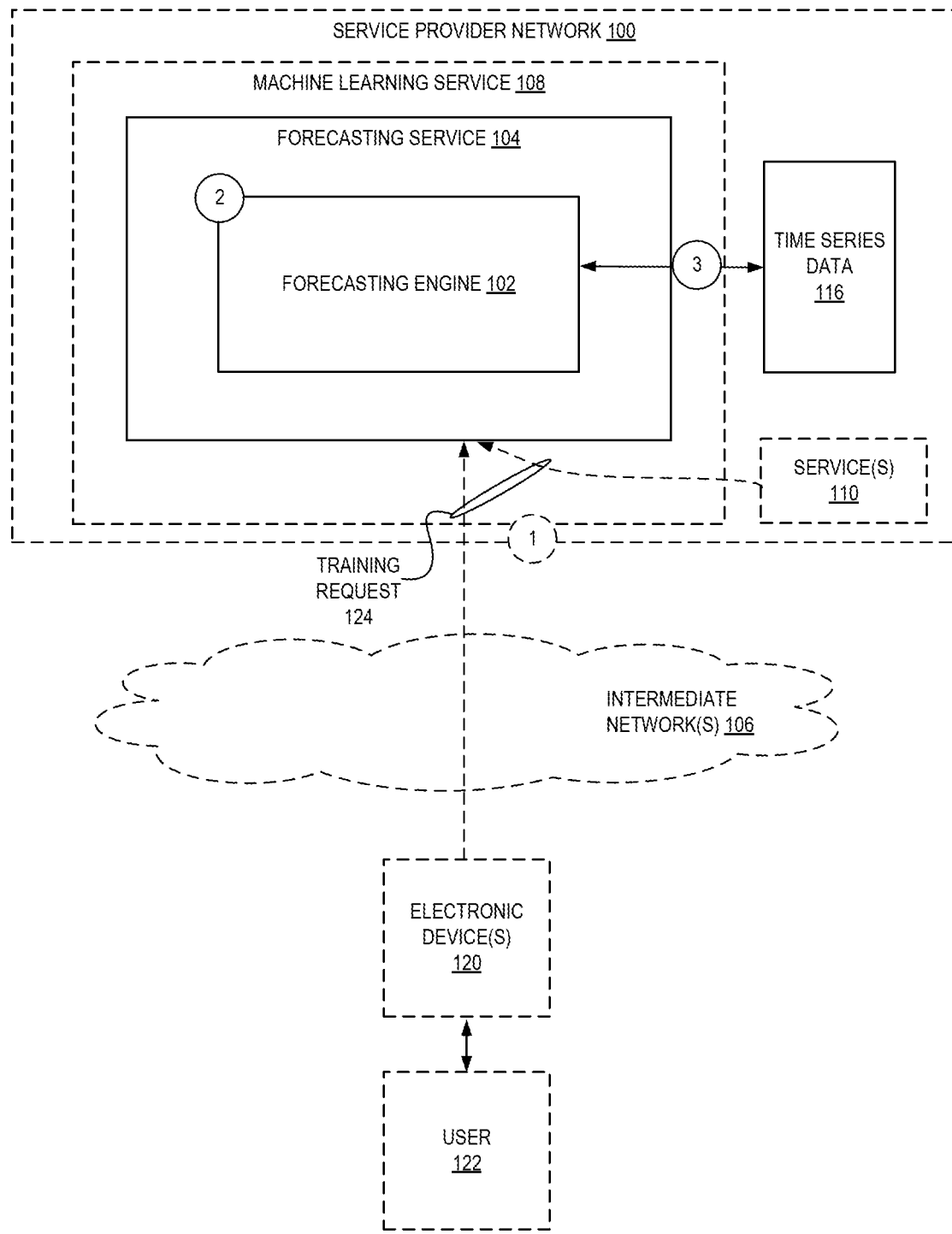
FIG. 1 is a diagram illustrating an environment for training a probabilistic forecasting model based on a nonparametric representation of the output distribution according to some embodiments.

Various embodiments of methods, apparatus, systems, and non-transitory computer-readable storage media are described for a time series probabilistic forecasting framework that combines recurrent neural networks (RNNs) with a flexible, nonparametric representation of the output distribution. According to some embodiments, the representation is based on the nonparametric quantile function (instead of, for example, a parametric probability density function) and is trained by minimizing a continuous ranked probability score (CRPS) derived from the quantile function. Unlike methods based on parametric probability density functions and maximum likelihood estimation, the techniques described herein can flexibly adapt to different output distributions without manual intervention. Furthermore, the nonparametric nature of the quantile function provides a significant boost in the approach's robustness, making it more readily applicable to a wide variety of time series datasets.

In some embodiments, the time series probabilistic forecasting techniques described herein can be used as part of a computer-implemented forecasting service that enables developers, data scientists, and others to build, train, and deploy machine learning models at any scale. For example, the forecasting techniques can be used as part of a forecasting service or as part of a broader machine learning (ML) service of a service provider network.

The problem of forecasting the future values of a time series arises in numerous contexts. For example, those in the finance industry often wish to predict the future movement of stock prices. In the retail space, an accurate forecast of product demand can result in significant cost reductions through optimal inventory management and allocation. Traditionally, forecasting methods, such as Autoregressive Integrated Moving Average (ARIMA) or Exponential Smoothing (ETS), aim at predicting the future values of each time series individually (or of small groups) given its past values. These techniques can be effective if the characteristics of the data align with the modeling assumptions but can neither easily leverage rich metadata and covariate information, nor learn complex temporal behavior across multiple time series. The increasing complexity of forecasting problems has led to an emergence of forecasting techniques based on deep learning in general and, more specifically, on RNNs and, in particular, to the widely-used Long-Short-Term-Memory (LSTM) variant, in particular.

Regardless of the underlying model, the goal of probabilistic forecasting is the estimation of the probability distribution of a time series' future values conditioned on its past. Typically, this is done by factorizing the probability distribution across time and modeling the one-dimensional conditional distribution $P(x_t|x_{1:t-1})$, where the information conveyed by the past observations is often summarized by a latent variable, for example, $P(x_t|h_t)$ where $h_t$ depends on the previous observations. There are various ways of representing such a conditional probability distribution, for example, one could model the conditional probability density function (PDF) or the conditional cumulative distribution function (CDF) through the corresponding parameters that define these representations (if a parametric form is applicable). To capture more complex distributions, a mixture of simpler densities can be used, for example, a mixture-of-Gaussians model. However, all these representations can be restricting because they make explicit assumptions about the distribution that governs the data. Further, the choice of parametric distribution is often based on mathematical convenience rather than evidence. In particular, the vast majority of techniques assume a Gaussian distribution even though this choice is rarely adequate.

According to embodiments described herein, the conditional distribution is instead represented using the quantile function, which is defined as:

$$F_{Z|X=x}^{-1}(\alpha) \mathit{inf}\{z \in R: \alpha \leq F_{Z|X=x}(\mathcal{Z})\}. \tag{1}$$

As indicated by the notation $F_{Z|X=x}^{-1}$, the quantile function is the inverse of the cumulative distribution function (CDF) $Z|X=x^{-1}$, if the inverse exists (namely, if $Z|X=x^{-1}$ is continuous and strictly monotonically increasing). Intuitively, the quantile function $F_{Z|X=x}^{-1}:[0,1]\to\mathbb{R}$ maps a quantile level $\alpha\in[0, 1]$ to the point z such that, conditioned on X=x, the probability that Z takes on values less than z is $\alpha$.

The use of a quantile function has several appealing properties. For example, it can be used directly for reading off prediction intervals or to generate samples from the distribution (by sampling u~Uniform(0, 1) and computing $y=F^{-1}(u)$, a sample y from the distribution F is obtained). In a nonparametric learning setting, the quantile function is easier to model and handle properly since the only requirement on $F^{-1}$ being a valid quantile function is that it is monotonically nondecreasing on [0, 1]. This requirement is easier to enforce and verify than the requirement for a PDF, for example, which needs to integrate to 1.

According to embodiments described herein, a forecasting model is proposed that combines the forecasting capacity of LSTM networks with the nonparametric flexibility of quantile functions. This approach includes an RNN-based framework for probabilistic forecasting that models the quantile function of each time series. The network is trained by minimizing the continuous ranked probability score (CRPS), which has not been previously used as a loss function in the setting of time series forecasting. Among other benefits, learning a nonparametric quantile function is an efficient and robust approach that avoids the challenges of the correct density selection.

FIG. 1 is a diagram illustrating an exemplary environment for training a model for time series forecasting according to some embodiments. In FIG. 1, a forecasting engine 102—which may be implemented as software, hardware, or combinations thereof—may be part of a forecasting service 104, which could be implemented in a service provider network 100 (for example, optionally via use of a machine learning service 108).

A provider network 100 provides users with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, and so forth. These and other computing resources may be provided as services, such as a hardware virtualization service that can execute compute instances, a storage service that can store data objects, and so forth. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (for example, the internal via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

Figure 2:
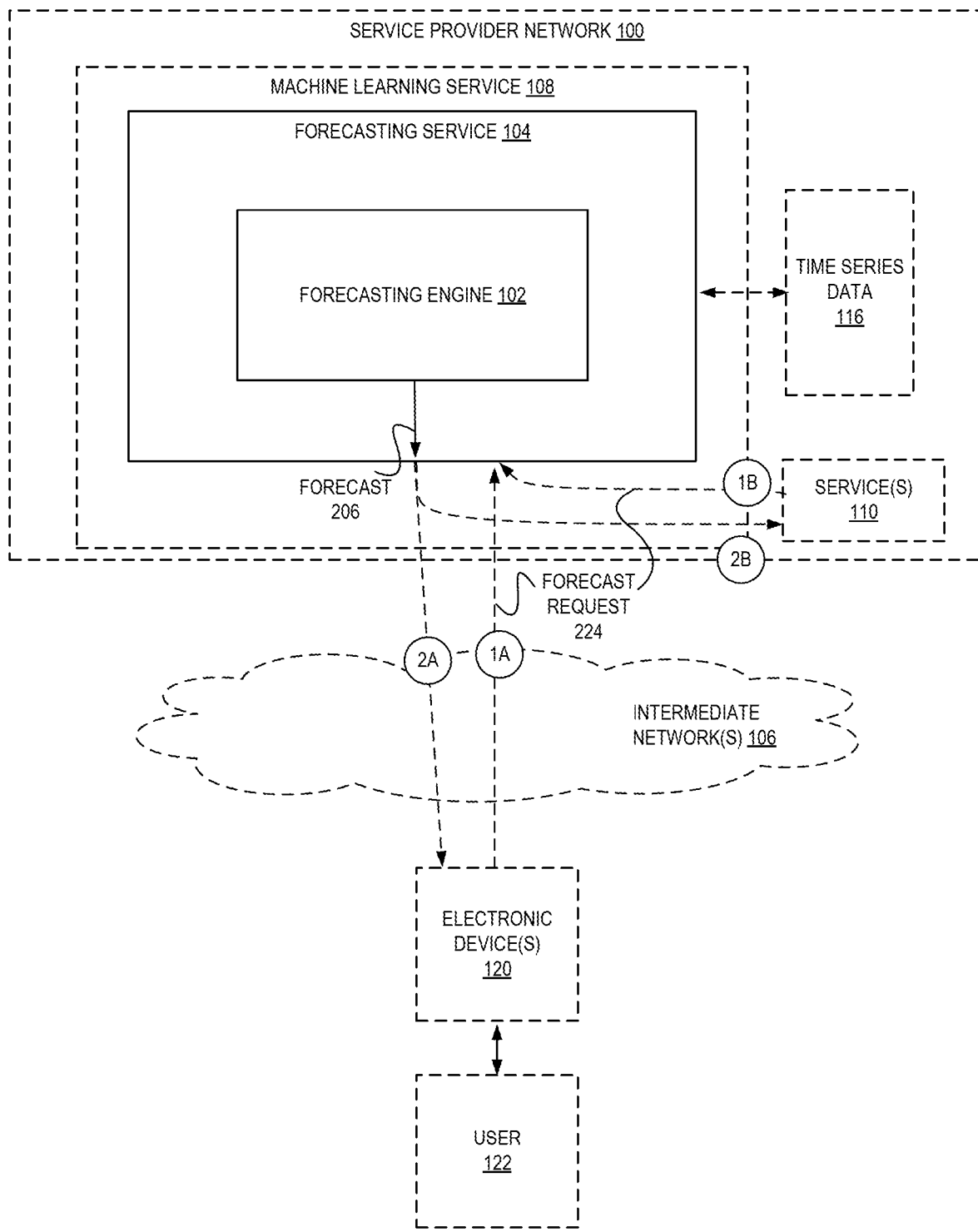
FIG. 2 is a diagram illustrating an environment for generating a forecast using a probabilistic forecasting model trained as described herein according to some embodiments.

In one embodiment, the forecasting engine 102 is implemented in whole or in part within a machine learning service 108 for training and/or forecasting. As is described elsewhere herein, a machine learning service 108 allows entities (for example, other services of the service provider network 100, or users of the service provider network 100) to train machine learning models and execute machine models as a service, such as via use of Hypertext Transfer Protocol (HTTP) requests issued to an endpoint associated with the machine learning service 108 (for example, in a provider network 100). For example, at optional circle labeled "1" in FIG. 1, an electronic device 120 operated by a user 122, or another service 110 (or any other application or system) internal or external to the service provider network 100, can issue a request 124 to train (or, as shown in FIG. 2, to use) models of a forecasting engine 102.

In an embodiment, the time series data 116 is stored within a service provider network 100 (for example, at a storage service) or outside of the service provider network, and may be identified (for example, using a URL) in the request to perform a training. The time series data 116 generally can be any type of time series data, including financial data, inventory data, data indicating computing resource performance, and so forth. As one example, the time series data can include data generated to measure performance characteristics of one or more computing resources managed by the service provider network 100. In some embodiments, the time series data can be associated with covariate data.

In an embodiment, at circle "2," the forecasting engine 102 trains a model based on the obtained time series data. To summarize an approach for training a model as described herein, training data based on time series data 116 and any available covariates and metadata are, at circle "3," fed into an autoregressive RNN (autoregressive and recurrent in the sense that the RNN takes as an input the value of the time series in the previous time step and the previous state of the network). The output of the RNN is processed by a projection layer that generates a set of parameters which define a spline function, that is, a quantile function estimate. The CRPS is then used as a loss function, which measures how good of a fit the quantile function is based on the time series data points.

An embodiment of a network architecture used to train a model is now described. In an embodiment, the value of the i-th time series at time t is denoted by $z_{i,t}$, and the covariates that correspond to the i-th time series at time t are denoted by $x_{i,t}$. A general conditioning time range $[1, t_0-1]$ is considered and a corresponding prediction time range $[t_0, T]$. During training, both ranges lie in the past so that all time series values $z_{i,1:T}=[z_{i,1}, \ldots, z_{i,T}]$, and the corresponding covariates $x_{i,1:T}=[x_{i,1}, \ldots, x_{i,T}]$, $\forall i$, are observed. However, during inference the time series values are available only in the conditioning time range, that is, $z_{i,1:t_0-1}$, $\forall i$, while the covariates may be available in both the conditioning and prediction ranges (for example, the covariates can encapsulate future information about holidays, product promotions, and so forth, that can be known in advance).

In general, an objective is to estimate the conditional quantile function $$F^{-1}(\mathcal{Z}_{i,t}|z_{i,1:t-1},x_{i,1:T}), \text{ for } t=t_0, \ldots, T, \quad (2)$$

that is, it is desired to estimate the quantile function in the prediction time range of each time series given all past observations and all the covariates. For this, a quantile model $q(\alpha|\theta(h_{i,t},\Theta))$ is considered, which is a function of the quantile level $\alpha$. Further, its parameters $\theta$ are functions of the output $h_{i,t}$ of an autoregressive recurrent neural network, with $$h_{i,t}=r(h_{i,t-1},\mathcal{Z}_{i,t-1},x_{i,t},\Theta). \quad (3)$$

In an embodiment, the function $r(\cdot)$ is a multi-layer recurrent neural network with LSTM cells, where the exact architecture being application dependent, and $\Theta$ represents the parameters of the neural network.

Figure 3:
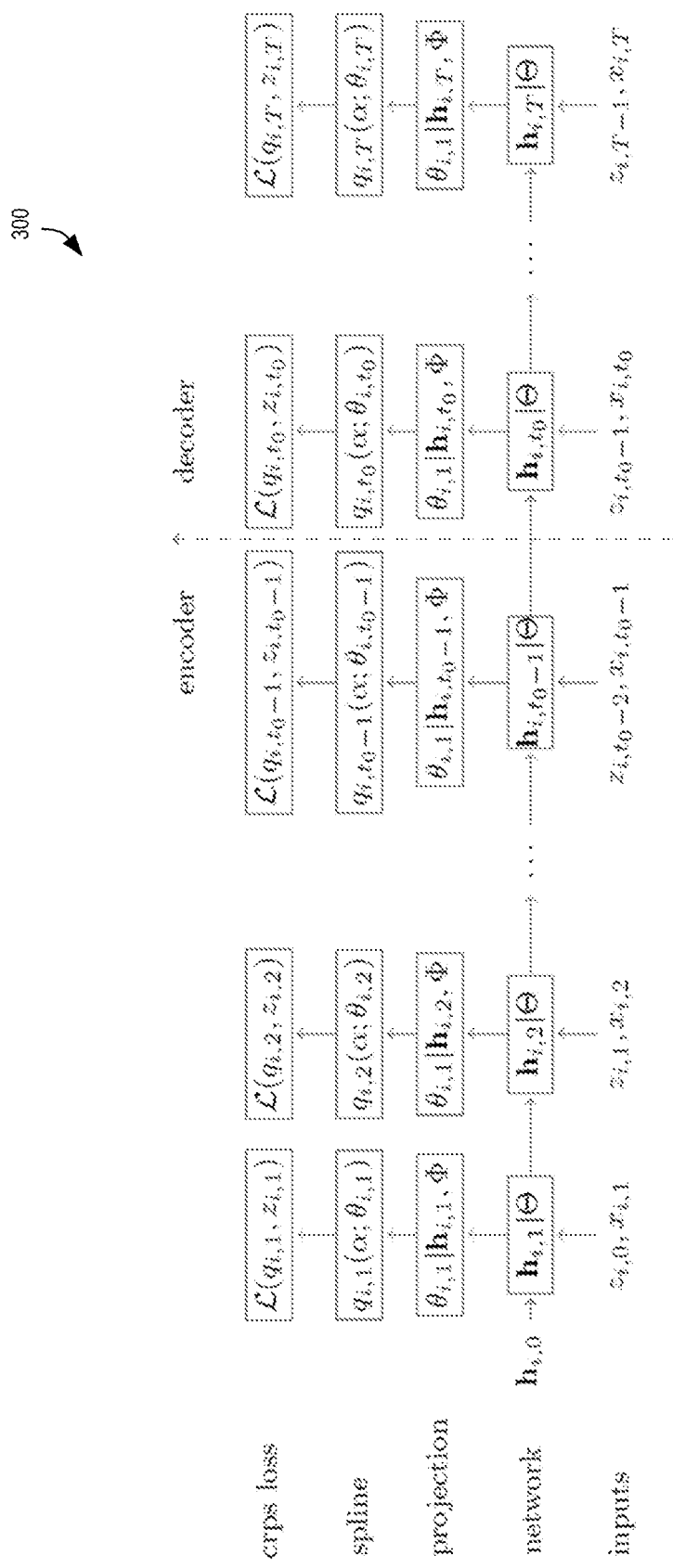
FIG. 3 is a diagram illustrating a training procedure used to create a probabilistic forecasting model according to some embodiments.
Figure 4:
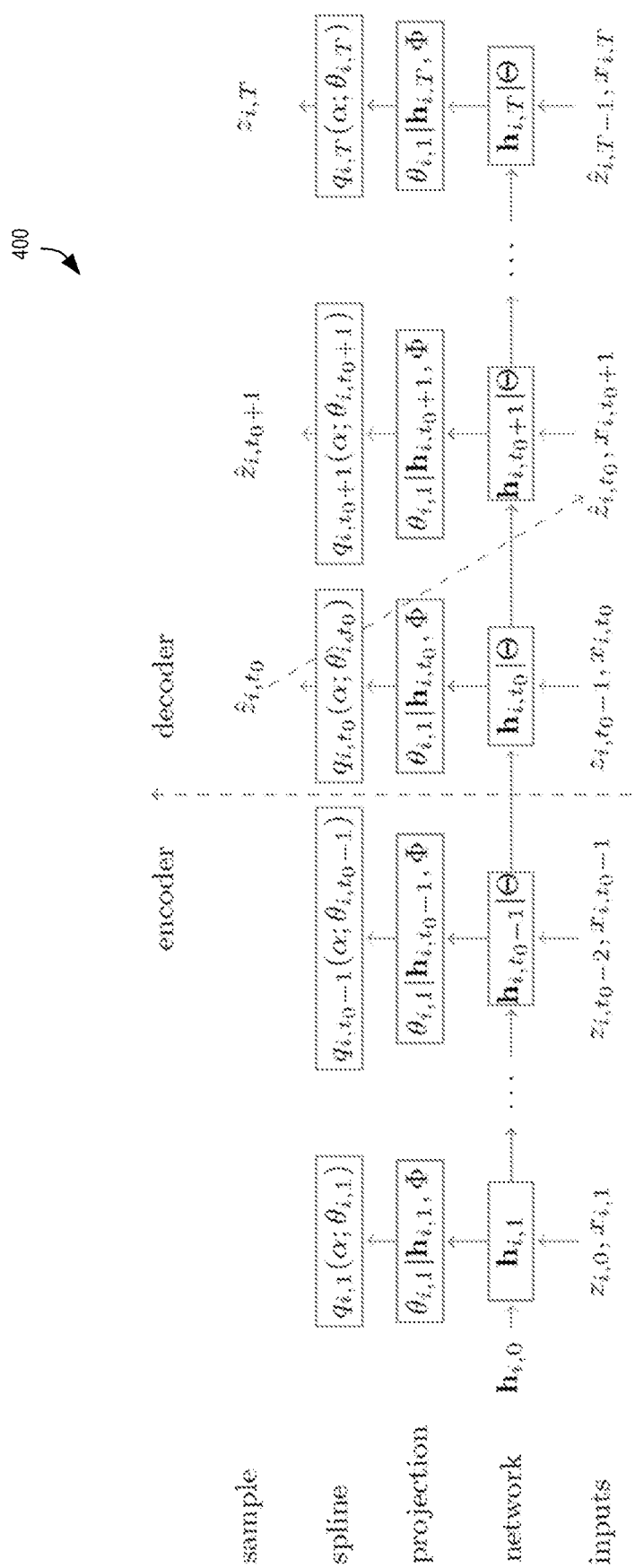
FIG. 4 is a diagram illustrating an inference procedure for using a probabilistic forecasting model according to some embodiments.

In an embodiment, the same architecture is used for the conditioning and prediction range, although in a sequence-to-sequence network, the encoder and decoder can have different architectures in principle. Further, their weights are shared, as shown in FIG. 3 and FIG. 4, so the initial state of the decoder is the final state of the encoder, that is, $h_{i,t_0-1}$. On the other hand, the initial state of the encoder $h_{i,0}$ and $z_{i,0}$, $\forall i$, are set to zero.

Isotonic Regression Splines

The description above illustrates a neural network that outputs parameters that define a quantile function. According to various embodiments, the quantile function can take various forms. In an embodiment, the quantile functions are considered in a nonparametric setting and therefore splines are used to model them, where a special consideration can be made since the splines are to comply with the nondecreasing property of the quantile functions. Described below are two variations of a piecewise-linear spline, and further described is how its parameters can be restricted to enforce monotonicity.

Piecewise-Linear Isotonic Regression Splines

Linear regression splines are parameterized, piecewise-linear functions of the form $$q(\alpha; \gamma_0, \beta_0, b, c) = \gamma_0 + \beta_0 \alpha + \sum_{l=1}^{L} b_l(\alpha - c_l)_+, \quad (4)$$

where $\gamma_0$ is the intercept term, $\beta_0 \in \mathbb{R}$ and $b \in \mathbb{R}^L$ are weights describing the slopes of the function pieces, $c \in \mathbb{R}^L$ is a vector of "knot" positions, that is, the starting points of the pieces (the first piece starts at 0 and is simplified to $\beta_0(\alpha-0)_+=\beta_0\alpha)$, and $(x)_+=\max(x, 0)$ is the "hinge" or ReLU function. The number of piecewise components L is a hyperparameter of the spline. All the parameters of the spline are functions of the output of the RNN and in particular they are obtained by an affine transformation of $h_{i,t}$ and a nonlinear activation that projects them to the right domain. For this reason, this last layer can be referred to as the projection layer.

In one embodiment, it is ensured that the knots of the spline are ordered, that is, $c_l < c_{l+1}$, for $l=1, \ldots, L-1$. In the case of a quantile function, the domain is always $[0, 1]$ and therefore it further holds that $0 < c_l \leq 1$, $\forall l$. To satisfy these constraints, the spaces $\Sigma l$ are parameterized between the positions instead of the positions themselves using L+1 spacing parameters. The spaces $\rho l$ are to be positive and add up to one, which can be achieved by applying an affine transformation followed by a softmax activation to the output of the network, that is, $$\rho = \text{softmax}(W_\rho^T h_{i,t} + b_\rho). \quad (5)$$

Now, the knot positions can be retrieved as follows:

$$c_l = \sum_{l=1}^{L} \rho_l. \quad (6)$$

Note that there are L+1 knot spacings but the knots are retrieved by summing the first L since the summation of all the spacings is always equal to one.

From the above, it is noted that $c_l < c_{l+1}$ and $0 \leq c_l \leq 1$, for $l=0, \ldots, L$.

Next, the monotonicity of the spline is ensured. The slope between two knots $c_l$ and $c_{l+1}$ is given by $$m_l = \beta_0 + \sum_{i=1}^{l} b_i.$$

Thus, if it desired for equation (4) to be nondecreasing, it is ensured that $m_l \geq 0$, 550 l. However, note that in this parametrization, the individual weights $b_l$ can be allowed to be negative, otherwise equation (4) could only capture convex shapes. To constrain all the slopes $m_l$ to be nonnegative, $$b_l = \beta_l - \beta_{l-1}, \quad (7)$$

where $\beta_l \geq 0$, $\forall l$. This can be achieved, for example, by applying an affine transformation to the output of the network, followed by a softplus activation, that is $$\beta = \log(1+\exp(W_\beta^T h_{i,t} + b_\beta)), \quad (8)$$

where all the functions are applied elementwise. Parameterizing $b_l$ in this way yields $m_l = \beta_l \geq 0$.

Finally, $\gamma_0$ is a real number that can be obtained by applying a simple affine transformation to the output of the network, that is, $$\gamma_0 = w_{\gamma_0}^T h_{i,t} + b_{\gamma_0}. \quad (9)$$

Overall, the projection layer outputs one real numbers $\gamma_0$, as well as two vectors of nonnegative numbers $\rho_1, \ldots, \rho_{L+1}$, and $\beta_0, \ldots, \beta_L$, for a total of 2L+3 parameters. For convenience, $\Phi$ denotes the set of all weights and biases of the projection layer, that is, $\Phi = \{w_{\gamma_0}, b_{\gamma_0}; W_\beta, b_\beta, W_\rho, b_\rho\}$.

Imposing Common Shape

The piecewise-linear spline is parametrized in such a way that all of its parameters depend on the output of the network $h_{i,t}$. This results in a quantile function with potentially very different parameters for each time series and each time step, which may be harder to learn. To overcome this, in one embodiment, some parameters can be restricted to be common for all time series and time steps such that the shape of the quantile functions does not vary significantly. In particular, the knot spacing parameters can be restricted as follows:

$$\rho = \text{soft max}(w_\rho), \quad (10)$$

that is, $\rho$ depends only on the weights $w_\rho$ and not on the output of the network that depends on a particular time series and time step. In this case, the parameter set $\Phi$ changes accordingly.

CRPS Optimization

Pinball Loss

One loss function for quantile regression is pinball loss, which (for a single observation $\mathcal{Z}$) is defined as:

$$\Lambda_\alpha(q,z) = (\alpha - \mathcal{I}_{[z<q]})(z-q), \quad (11)$$

where $$\mathcal{I}_{[z<q]} = \begin{cases} 1, & \text{if } z < q, \\ 0, & \text{otherwise,} \end{cases} \quad (12)$$

is the indicator function $0<\alpha<1$ is the quantile level of interest, $z \sim F$ is an observation with distribution F, and q is the predicted $\alpha$-th quantile. The value $q^*$ that minimizes the expected value of the pinball loss over the data distribution $F(z)$ is the $\alpha$-th quantile of F, that is, $$q^* = F^{-1}(\alpha) = \text{argmin}_q \mathbb{E}_{F(z)}[\Lambda_\alpha(q,z)]. \quad (13)$$

In practice, the distribution F is parametrized by a set of parameters $\theta$. To train a model to predict the $\alpha$-th quantile of a nonparametric distribution given a set of observations $z_i \sim F_\theta$, with $i=1, \ldots, N$, in one embodiment, the following optimization problem is solved:

$$\underset{\theta}{\text{minimize}} \sum_{i=1}^{N} \Lambda_\alpha(q(\alpha;\theta), z_i), \quad (14)$$

where $q(\alpha;\theta) = F_\theta^{-1}(\alpha)$ can be for example a neural network parametrized by $\theta$.

Huber Pinball Loss

One potential issue that can arise during optimization is the non-differentiability of equation (11) at the origin. In one embodiment, a smooth approximation of the pinball loss can be used based on the well-known Huber loss, which is defined as:

$$h(x) = \begin{cases} \dfrac{x^2}{2\epsilon}, & |x| < \epsilon, \\ |x| - \dfrac{\epsilon}{2}, & |x| \geq \epsilon, \end{cases} \quad (15)$$

where $\epsilon > 0$.

Now, the pinball loss can be approximated as follows:

$$\tilde{\Lambda}_\alpha(q,z) = (\alpha - \mathcal{I}_{[z<q]}) \text{sgn}(z-q) h(z-q), \quad (16)$$

where $$\text{sgn}(x) = \begin{cases} -1, & x < 0, \\ 0, & x = 0, \\ 1, & x < 0. \end{cases} \quad (17)$$

is the sign function.

Continuous Ranked Probability Score (CRPS)

The pinball loss focuses on a specific point of the probability function, that is, only the quantile. However, in some embodiments, it desired to estimate the whole distribution and not just a specific quantile. In one embodiment, the continuous ranked probability score (CRPS) can be used to estimate the whole distribution.

The CRPS (for a given observation $\mathcal{Z}$) is defined as:

$$CRPS(F_\theta, z) = \int_{-\infty}^{\infty} (F_\theta(q) - \mathcal{I}_{[z<q]})^2 dq = \int_0^1 2\Lambda_\alpha(q(\alpha;\theta), z) d\alpha, \quad (18)$$

and is effectively the pinball loss integrated over the whole range of quantile levels. Given a predictive distribution $F_\theta$ or the corresponding quantile function $q = F_\theta^{-1}$, the CRPS measures how compatible the observed value z is with the prediction.

A property of the CRPS is that it is a proper scoring rule, that is, $$\int g(z) \text{XRPS}(G,z) dz \leq \int g(z) \text{CRPS}(F,z) dz \quad (19)$$

for any distributions F and G (with g being the density of G). In other words, if the data is drawn from G, the CRPS is minimized if the predictive distribution is equal to G.

Further, for a deterministic prediction, the distribution F reduces to $\mathcal{I}_{[z<c]}$, where c is the predicted value. In that case, CRPS becomes equivalent to MAE. However, note that CRPS does not distinguish between distributions whose cumulative errors from the target distribution are equal in the sense of the $\ell_2$-norm.

Although the CRPS is sometimes used as a scoring rule for a given trained model, as indicated above, here is it being directly used as a loss function to be minimized Clenshaw-Curtis Quadrature In a nonparametric setting, where the quantile function model can be a neural network for which the CRPS has no analytic form, optimizing directly the CRPS is not feasible. In these cases, numerical approximations can be used to compute the integral. Since the equation (18) can be written as $$\int_0^1 2\Lambda_\alpha(q(\alpha;\theta), z) d\alpha = E_{u \sim \text{Uniform}(0,1)}[2\Lambda_u(q(u;\theta), z)], \quad (20)$$

one way to approximate the CRPS is to generate K standard uniformly distributed samples to approximate the expectation, that is, $$E_{u \sim \text{Uniform}(0,1)}[2\Lambda_u(q(u;\theta), z)] \approx \frac{1}{K} \sum_{k=1}^{K} 2\Lambda_{u_k}(q(u_k;\theta), z), \quad (21)$$

with $u_k \sim \text{Uniform}(0, 1)$, for $k=1, \ldots, K$. One challenge with this approach is that, for a good approximation of the expectation, a large number of samples need to be drawn, and this process is to be repeated for every observation z. This sampling procedure can be very costly, especially if a tight approximation is desired.

In one embodiment, because the CRPS is a one-dimensional integral, the Clenshaw-Curtis quadrature is used. The Clenshaw-Curtis quadrature is a method for numerical integration that is based on the expansion of the integrand in terms of Chebyshev polynomials, where the function $f(x)$ to be integrated over the fixed interval $[-1, 1]$ is evaluated at the K roots of a Chebyshev polynomial. Then, the integral can be approximated as:

$$\int_{-1}^{1} f(x)dx \approx w^\top y, \quad (22)$$

where $$w = = D^T d, \quad (23)$$

are the quadrature weights, with $d \in \mathbb{R}^{K/2+1}$ and $D \in \mathbb{R}^{(K/2+1) \times (K/2+1)}$. In particular, the k-th element of d (with zero-based indexing is given by $$d_k = \begin{cases} 1, & k = 0, \\ 2/(1-(2k)^2), & k = 1, \ldots, K/2-1, \\ 1/(1-K^2), & k = K/2, \end{cases} \quad (24)$$

while the (m, k)-th element of D is defined as $$D_{mk} = \frac{2}{K}\cos\left(\frac{mk\pi}{K/2}\right) \times \begin{cases} 1/2, & k = 0, K/2, \\ 1, & \text{otherwise.} \end{cases} \quad (25)$$

Notice that both D and d are independent of the function $f(x)$ and therefore can be precomputed in $O(K \log K)$. The information of the function is encoded in the vector $y \in \mathbb{R}^{K/2+1}$, where the k-th element can be computed as Finally, since CRPS is to be integrated into the $[0, 1]$ interval, the change of variable $\alpha' = 2\alpha - 1$ can be applied and the new CRPS integral becomes $$\int_{-1}^{1} \Lambda_\alpha(q(\alpha; \theta), z)d\alpha'. \quad (27)$$

where $\alpha = (\alpha'+1)/2$, and also accounted for is the Jacobian factor which is equal to ½. The CRPS integral in equation (27) has the right limits and the Clenshaw-Curtis quadrature can be applied accordingly.

Analytic Integration

The Clenshaw-Curtis quadrature is a fast and tight approximation of the CRPS integral, even with a small number of quadrature points K. However, for specific spline functions, it is possible to derive an analytic expression of the CRPS integral. In particular, the integral for the piecewise-linear spline becomes $$\int_0^1 S\Lambda_\alpha(q(\alpha;\theta), z)d\alpha = (2\tilde{a}-1)z + (1-2\tilde{a})\gamma_0 + \left(\frac{1}{3} - \tilde{a}^2\right)\beta_0 + \sum_{l=1}^{L} b_l\left(\frac{1-c_l^3}{3} - c_l - \max(\tilde{a}, c_l)^2 + 2\max(\tilde{a}, c_l)c_l\right). \quad (28)$$

Here $\tilde{a}$ is the quantile level such that $q(\tilde{a};\theta) = \mathcal{Z}$ given by $$\tilde{a} = \frac{z - \gamma_0 + \sum_{l=1}^{l_0} b_l c_l}{\beta_0 + \sum_{l=1}^{l_0} b_l}, \quad (29)$$

where $l_0 = \max\{l | q(c_l;\theta) < z, 0 \leq l \leq L\}$, with $c_o = 0$ can be found in $O(L)$.

In an embodiment, an analytic solution can be derived for the case of the Huber pinball loss $\tilde{\Lambda}(\alpha;\theta)$. However, the analytic expression is fairly complex and the quadrature approximation may be more suitable in this case. For other kind of splines (for example, sigmoidal, I-splines) an analytic solution of the CRPS integral does not exist and therefore an approximation can be used instead.

Figure 5:
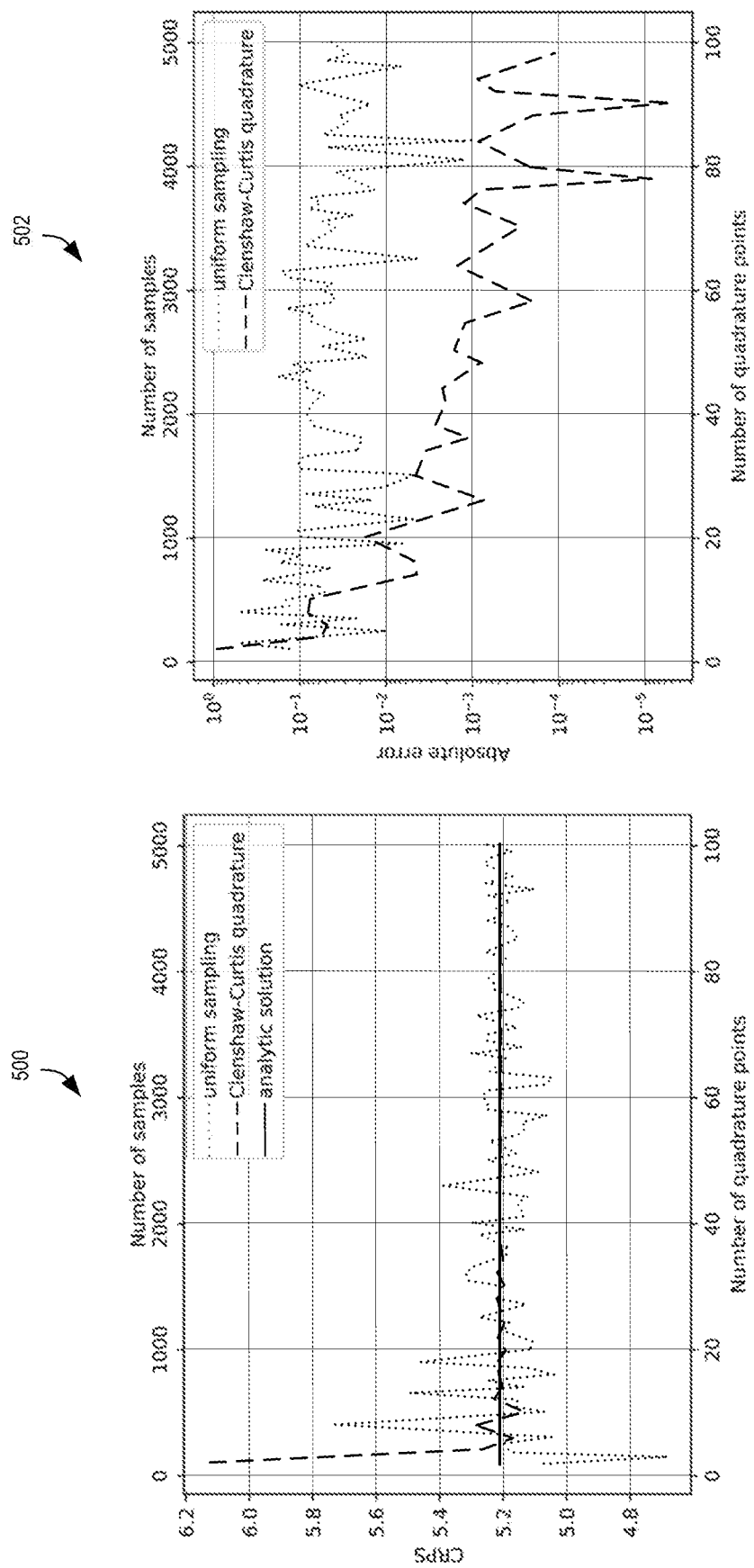
FIG. 5 includes diagrams illustrating evaluation of continuous ranked probability score (CRPS) integral analytically, and the absolute error of approximate methods, according to some embodiments.

FIG. 5 illustrates the approximation of the CRPS integral using the quadrature method and by taking uniform samples. It's noted that the quadrature method is already a tight approximation for 20 quadrature points, whereas the uniform sampling approximation has almost two order of magnitude larger error even with thousands of samples. As shown in FIG. 5, the graph 500 shows evaluation of the CRPS integral analytically, using the Clenshaw-Curtis quadrature, and with uniform sampling. The graph 502 shows absolute error of the approximation methods. The parameters for the graphs are as follows:

$\gamma_0=1, \beta_0=4, b=[12,15,13]^T, c=[0.1,0.3,0,8]^T, \mathcal{Z}=26$

Training

Given a set of time series $z_{i,1:T}$, and the corresponding covariates $x_{i,1:T}$, for $i=1, \ldots, N$, in an embodiment, the goal is to learn the parameters of the network, and the parameters of the spline function, by minimizing the CRPS approximated by the Clenshaw-Curtis quadrature. That is, the loss function is $$\mathcal{L} = \sum_{i=1}^{N} \sum_{t=1/t=t_0}^{T} w^\top y_{i,t}. \quad (30)$$

where w is a vector with the fixed quadrature weights, defined in equation (23), while the k-th entry of $y_{i,t}$ is given by $$y_{k,i,t} = \Lambda_{\alpha_{k+}}(q(\alpha_{k+};\theta(h_{i,t};\Theta)), \mathcal{Z}_{i,t}) + \Lambda_{\alpha_{k-}}(q(\alpha_{k-};\theta(h_{i,t};\Theta)), \mathcal{Z}_{i,t}) \quad (31)$$

as defined in equation (26). Here, the following is set $$\alpha_{k+} = \frac{\cos(2\pi k/K)+1}{2}, \quad (32)$$

$$\alpha_{k-} = \frac{-\cos(2\pi k/K)+1}{2}, \quad (33)$$

to account for the variable change of equation (27). Finally, the function $q(\cdot)$ is the piecewise-linear spline given by equation (4).

During training, in one embodiment, the time series is split into windows with different starting points and therefore multiple training instances are generated. Each window has a fixed length T which includes the conditioning and the prediction ranges. The windows are selected in such a way that there are available data for the entire prediction range. In other examples, the starting points can lie before the start of the time series, and in that case the time series are padded with zeros. It is noted that in equation (30) the summation over different time steps is either from t=1 or from t=$t_0$, that is, both the encoder and the decoder loss can be included, or just the decoder loss in the optimization. In some embodiments, including both losses can provide a performance boost to the algorithm.

In one embodiment, the training is performed according to an iterative process, as illustrated by FIG. 3. As shown in FIG. 3, at each time step t, the inputs to the network are the covariates $x_{i,t}$, the target value at the previous time step $z_{i,t-1}$, as well as the previous network output $h_{i,t-1}$. The network output $h_{i,t}=r(h_{i,t-1}, \mathcal{Z}_{i,t-1}, x_{i,t}, \Theta)$ is then fed to the projection layer which outputs the parameters $\theta_{i,t}=\theta(h_{i,t}, \Phi)$ that define the spline function. Finally, the spline function and the target value $\mathcal{Z}_{i,t}$ are used to compute the CRPS loss and train the model. The training process illustrated in FIG. 3 (and the forecasting generation process illustrated in FIG. 4), for example, can be implemented in whole or in part by a forecasting engine 102 of a forecasting service 104, as shown in FIG. 1 and FIG. 2.

Thereafter, as reflected in FIG. 2, upon the submission of a request 224 to generate a forecast (for example, at circle "1A" and/or circle "1B"), which may specify a time window for the forecast, among other request parameters, the forecasting engine 102 can use the generated model(s) to generate a time series forecast 206. The forecast 206 can include, for example, a data representation of an output probability distribution for a requested time period, and optionally can be provided back to the electronic device 120 at circle "2A," another service/application at circle "2B," stored in a data store, and so forth.

During inference, the time series values in the prediction range, that is, $z_{i,t_0:T}$, $\forall i$, are unknown and the network output $h_{i,t}$ cannot be computed for t≥$t_0$. For this, at each time step t≥$t_0$, a single sample $\mathcal{Z}_{i,t}=w(\alpha;\theta)$ is generated, with $\alpha$~Inform(0, 1), and the sample is fed into the network to generate a sample path for the prediction range. By repeating this process several times, that is, by constructing several sample paths, any empirical confidence interval or specific quantile value for the whole prediction range can be evaluated.

FIG. 4 is a diagram illustrating the inference procedure. As shown, in the conditioning range (t<$t_0$) the (known) history of the time series $\mathcal{Z}_{i,t}$ is fed into the network, along with the corresponding covariates. In the prediction range (t≥$t_0$) a sample $\mathcal{Z}_{i,t}=q(\alpha;\theta)$, with $\alpha$~Uniform(0, 1), is drawn and fed back for the next point until the end of the prediction range t=T, generating one sample trace. Repeating this prediction process yields many traces representing the joint prediction distribution.

Figure 6:
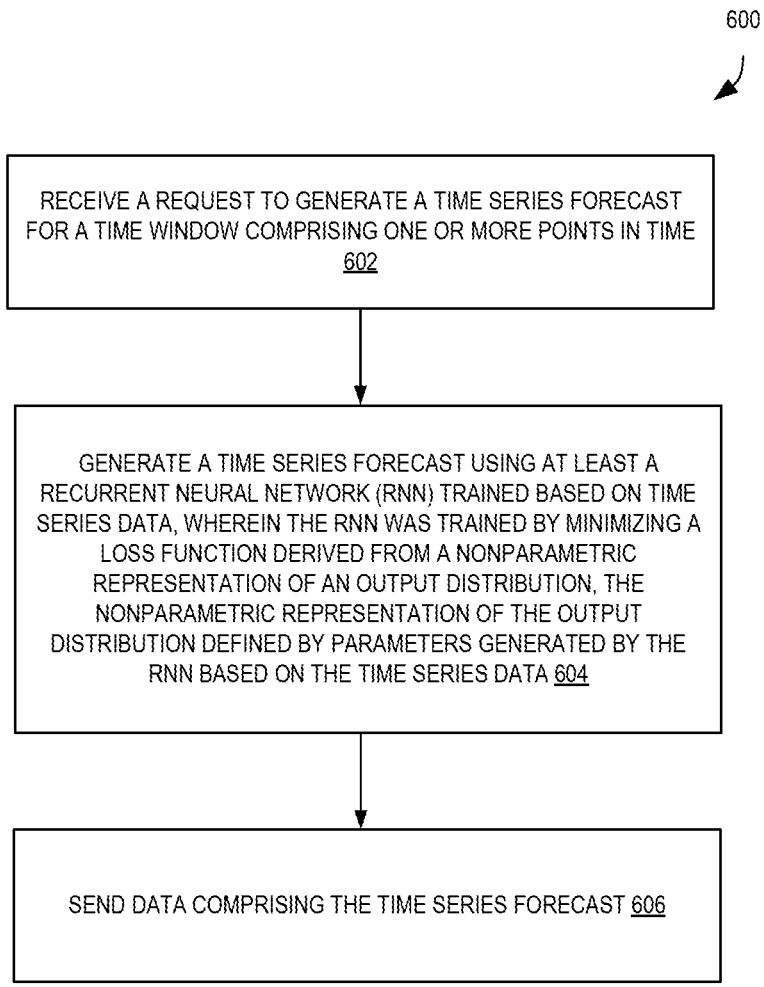
FIG. 6 is a flow diagram illustrating operations of a method for generating a time series forecast according to some embodiments.

FIG. 6 is a flow diagram illustrating operations 600 of a method for generating a time series forecast according to some embodiments. Some or all of the operations 600 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the forecasting engine 102 (or forecasting service 104, machine learning service 108, or service provider network 100) of the other figures.

The operations 600 include, at block 602, receiving, at a web service endpoint of a service provider network, a request to generate a time series forecast for a time window comprising one or more points of time. Referring to FIG. 2, for example, a forecast request 224 can be received by a forecasting service 104 from either a user 122 via an electronic device 120, from another service of the service provider network 100, or from any other source. In an embodiment, the time window can be selected by default, or can be specified as part of the request. In one embodiment, the request specifies a number of parameters to be generated by the RNN based on the time series data. In one embodiment, the time series data is split into windows, each window having a fixed length and including a respective conditioning range and a prediction range.

The operations 600 further include, at block 604, generating the time series forecast using a recurrent neural network (RNN) trained on time series data, wherein the RNN was trained by minimizing a loss function derived from a quantile function, the quantile function defined by parameters generated by the RNN based on the time series data. In an embodiment, the loss function is one of: a continuous ranked probability score (CRPS), or a Huber loss function. In one embodiment, the parameters are generated by a projection layer that performs an affine transformation of an output of the RNN. In one embodiment, the parameters are generated by a multilayer perceptron (MLP).

In one embodiment, training the RNN includes, for each time series data point: generating a set of parameters which define a spline function, and using the spline function and a target value generated based on a previous time series data point to generate a continuous rank probability score (CRPS).

In one embodiment, the time series data comprises two or more separate time series, and at least one of the parameters generated by the RNN is restricted to be common for the two or more separate time series.

In one embodiment, generating the time series forecast further includes generating a plurality of sample paths in a prediction range.

The operations 600 include, at block 606, sending data representing the time series forecast, the time series forecast comprising a probability distribution.

In one embodiment, the request to generate the time series forecast is received at a web service endpoint of a service provider network, wherein the request was originated by an electronic device of a user. In this example, sending the data comprising the time series forecast comprises sending the data to the electronic device. In an embodiment, the request to generate the time series forecast is received at a web service endpoint of the service provider network, wherein the request was originated by a service of the service provider network. In this example, sending the data comprising the time series forecast comprises sending the data to the service of the service provider network.

Figure 7:
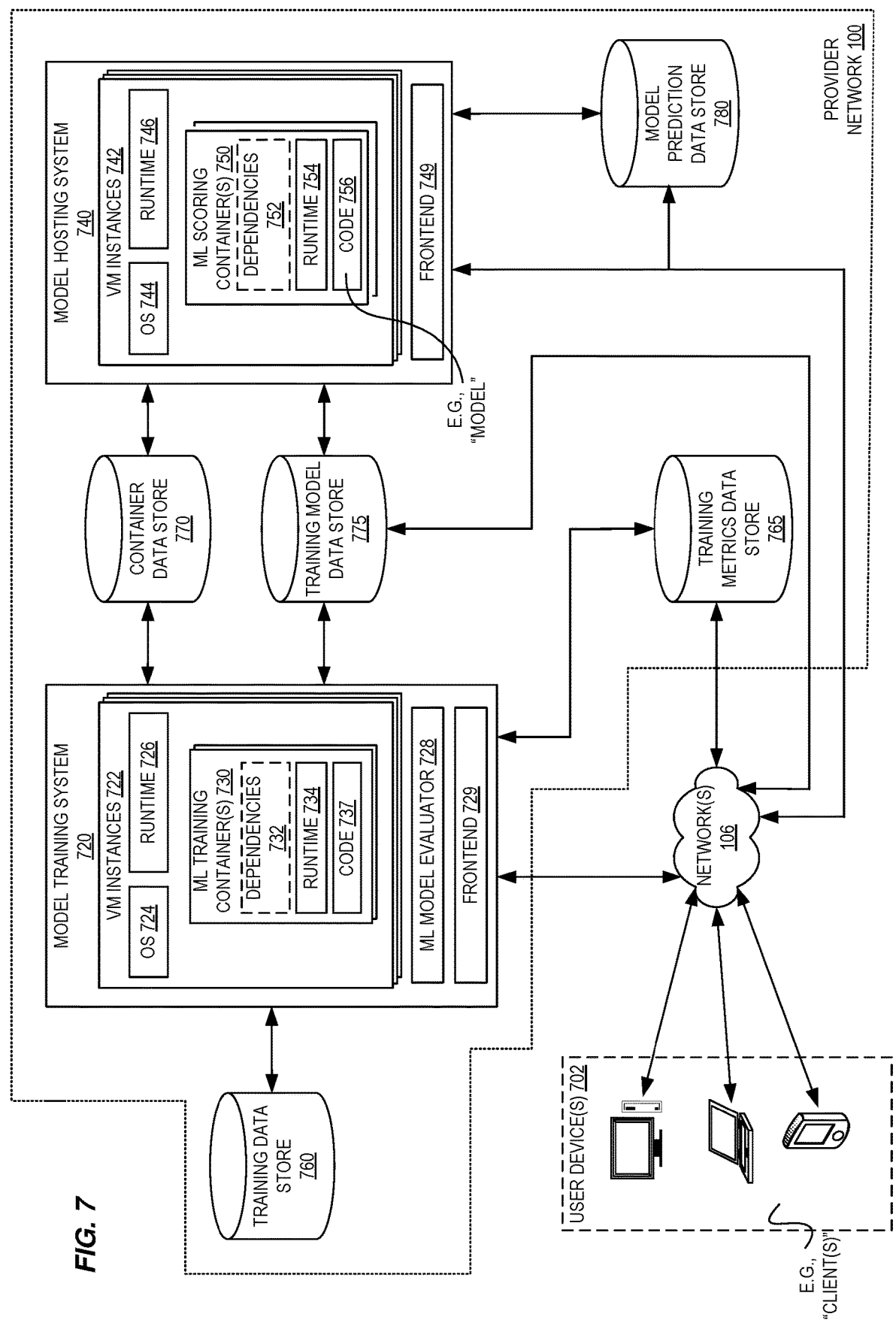
FIG. 7 is a block diagram of an illustrative operating environment in which machine learning models are trained and hosted according to some embodiments.

FIG. 7 is a block diagram of an illustrative operating environment in which machine learning models are trained and hosted according to some embodiments. The operating environment includes end user devices 702 (for example, electronic devices(s) 120), a model training system 720, a model hosting system 740, a training data store 760, a training metrics data store 765, a container data store 770, a training model data store 775, and a model prediction data store 780.

A machine learning service described herein may include one or more of these entities, such as the model hosting system 740, model training system 720, and so forth.

In some embodiments, users, by way of user devices 702, interact with the model training system 720 to provide data that causes the model training system 720 to train one or more machine learning models, for example, as described elsewhere herein. A machine learning model, generally, may be thought of as one or more equations that are "trained" using a set of data. In some embodiments, the model training system 720 provides ML functionalities as a web service, and thus messaging between user devices 702 and the model training system 720 (or provider network 100), and/or between components of the model training system 720 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 702 can interact with the model training system 720 via frontend 729 of the model training system 720. For example, a user device 702 can provide a training request to the frontend 729 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 702, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 702 may provide, in the training request, an algorithm written in any programming language. The model training system 720 then packages the algorithm into a container (optionally with other code, such as a "base" ML algorithm supplemented with user-provided code) that is eventually loaded into a virtual machine instance 722 for training a machine learning model, as described in greater detail below. For example, a user, via a user device 702, may develop an algorithm/code using an application (for example, an interactive web-based programming environment) and cause the algorithm/code to be provided—perhaps as part of a training request (or referenced in a training request)—to the model training system 720, where this algorithm/code may be containerized on its own or used together with an existing container having a machine learning framework, for example.

In some embodiments, instead of providing a container image in the training request, the user device 702 provides, in the training request, an indicator of a container image (for example, an indication of an address or a location at which a container image is stored). For example, the container image can be stored in a container data store 770, and this container image may have been previously created/uploaded by the user. The model training system 720 can retrieve the container image from the indicated location and create a container using the retrieved container image. The container is then loaded into a virtual machine instance 722 for training a machine learning model, as described in greater detail below.

The model training system 720 can use the information provided by the user device 702 to train a machine learning model in one or more pre-established virtual machine instances 722 in some embodiments. In particular, the model training system 720 includes a single physical computing device or multiple physical computing devices that are interconnected using one or more computing networks (not shown), where the physical computing device(s) host one or more virtual machine instances 722. The model training system 720 can handle the acquisition and configuration of compute capacity (for example, containers, instances, etc., which are described in greater detail below) based on the information describing the computing machine on which to train a machine learning model provided by the user device 702. The model training system 720 can then train machine learning models using the compute capacity, as is described in greater detail below. The model training system 720 can automatically scale up and down based on the volume of training requests received from user devices 702 via frontend 729, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 722 are utilized to execute tasks. For example, such tasks can include training a machine learning model. As shown in FIG. 7, each virtual machine instance 722 includes an operating system (OS) 724, a language runtime 726, and one or more ML training containers 730. Generally, the ML training containers 730 are logical units created within a virtual machine instance using the resources available on that instance and can be utilized to isolate execution of a task from other processes (for example, task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines a machine learning model. Changes made to the ML training containers 730 (for example, creation of new files, modification of existing files, deletion of files, etc.) are stored in the top container layer. If a ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737, and dependencies 732 needed by the code 737 in some embodiments. The runtime 734 can be defined by one or more executable instructions that form at least a portion of a container image that is used to form the ML training container 730 (for example, the executable instruction(s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines a machine learning model, which may reference (or utilize) code or libraries from dependencies 732. The runtime 734 is configured to execute the code 737 in response to an instruction to begin machine learning model training. Execution of the code 737 results in the generation of model data, as described in greater detail below.

In some embodiments, the code 737 includes executable instructions that represent algorithms that define different machine learning models. For example, the code 737 includes one set of executable instructions that represent a first algorithm that defines a first machine learning model and a second set of executable instructions that represent a second algorithm that defines a second machine learning model. In some embodiments, the virtual machine instance 722 executes the code 737 and trains all of the machine learning models. In some embodiments, the virtual machine instance 722 executes the code 737, selecting one of the machine learning models to train. For example, the virtual machine instance 722 can identify a type of training data indicated by the training request and select a machine learning model to train (for example, execute the executable instructions that represent an algorithm that defines the selected machine learning model) that corresponds with the identified type of training data.

In some embodiments, the runtime 734 is the same as the runtime 726 utilized by the virtual machine instance 722. In some embodiments, the runtime 734 is different than the runtime 726 utilized by the virtual machine instance 722.

In some embodiments, the model training system 720 uses one or more container images included in a training request (or a container image retrieved from the container data store 770 in response to a received training request) to create and initialize a ML training container 730 in a virtual machine instance 722. For example, the model training system 720 creates a ML training container 730 that includes the container image(s) and/or a top container layer.

Prior to beginning the training process, in some embodiments, the model training system 720 retrieves training data from the location indicated in the training request. For example, the location indicated in the training request can be a location in the training data store 760. Thus, the model training system 720 retrieves the training data from the indicated location in the training data store 760. In some embodiments, the model training system 720 does not retrieve the training data prior to beginning the training process. Rather, the model training system 720 streams the training data from the indicated location during the training process. For example, the model training system 720 can initially retrieve a portion of the training data and provide the retrieved portion to the virtual machine instance 722 training the machine learning model. Once the virtual machine instance 722 has applied and used the retrieved portion or once the virtual machine instance 722 is about to use all of the retrieved portion (for example, a buffer storing the retrieved portion is nearly empty), then the model training system 720 can retrieve a second portion of the training data and provide the second retrieved portion to the virtual machine instance 722, and so on.

To perform the machine learning model training, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train a machine learning model. The virtual machine instance 722 executes some or all of the executable instructions according to the hyperparameter values included in the training request. As an illustrative example, the virtual machine instance 722 trains a machine learning model by identifying values for certain parameters (for example, coefficients, weights, centroids, etc.). The identified values depend on hyperparameters that define how the training is performed. Thus, the virtual machine instance 722 can execute the executable instructions to initiate a machine learning model training process, where the training process is run using the hyperparameter values included in the training request. Execution of the executable instructions can include the virtual machine instance 722 applying the training data retrieved by the model training system 720 as input parameters to some or all of the instructions being executed.

In some embodiments, executing the executable instructions causes the virtual machine instance 722 (for example, the ML training container 730) to generate model data. For example, the ML training container 730 generates model data and stores the model data in a file system of the ML training container 730. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 720 itself) pulls the generated model data from the ML training container 730 and stores the generated model data in the training model data store 775 in an entry associated with the virtual machine instance 722 and/or the machine learning model being trained. In some embodiments, the virtual machine instance 722 generates a single file that includes model data and stores the single file in the training model data store 775. In some embodiments, the virtual machine instance 722 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 722 can package the multiple files into a single file once training is complete and store the single file in the training model data store 775. Alternatively, the virtual machine instance 722 stores the multiple files in the training model data store 775. The virtual machine instance 722 stores the file(s) in the training model data store 775 while the training process is ongoing and/or after the training process is complete.

In some embodiments, the virtual machine instance 722 regularly stores model data file(s) in the training model data store 775 as the training process is ongoing. Thus, model data file(s) can be stored in the training model data store 775 at different times during the training process. Each set of model data files corresponding to a particular time or each set of model data files present in the training model data store 775 as of a particular time could be checkpoints that represent different versions of a partially-trained machine learning model during different stages of the training process. Accordingly, before training is complete, a user, via the user device 702 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the training process. Thus, the model training system 720 can create multiple copies of the container image provided in a training request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (for example, information indicating that N ML training containers 730 are collectively training a machine learning model and that a particular ML training container 730 receiving the configuration information is ML training container 730 number X of N), which can be included in the resulting model data. By parallelizing the training process, the model training system 720 can significantly reduce the training time in some embodiments.

In some embodiments, a plurality of virtual machine instances 722 execute code 737 stored in a plurality of ML training containers 730. For example, the resources used to train a particular machine learning model can exceed the limitations of a single virtual machine instance 722. However, the algorithm included in the container image can be in a format that allows for the parallelization of the training process. Thus, the model training system 720 can create multiple copies of the container image provided in a training request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 720 can further provide configuration information to each ML training container 730 via the virtual machine instances 722 (for example, information indicating that N ML training containers 730 are collectively training a machine learning model and that a particular ML training container 730 receiving the configuration information is ML training container 730 number X of N, information indicating that M virtual machine instances 722 are collectively training a machine learning model and that a particular ML training container 730 receiving the configuration information is initialized in virtual machine instance 722 number Y of M, etc.), which can be included in the resulting model data. As described above, by parallelizing the training process, the model training system 720 can significantly reduce the training time in some embodiments.

In some embodiments, the model training system 720 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 720 includes a ML model evaluator 728. The ML model evaluator 728 can monitor virtual machine instances 722 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 728 can obtain the model data for a machine learning model being trained and evaluation data from the training data store 760. The evaluation data is separate from the data used to train a machine learning model and includes both input data and expected outputs (for example, known results), and thus the ML model evaluator 728 can define a machine learning model using the model data and execute the machine learning model by providing the input data as inputs to the machine learning model. The ML model evaluator 728 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 728 periodically generates model metrics during the training process and stores the model metrics in the training metrics data store 765 in some embodiments. While the machine learning model is being trained, a user, via the user device 702, can access and retrieve the model metrics from the training metrics data store 765. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 702, can transmit a request to the model training system 720 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 720 can modify the machine learning model accordingly. For example, the model training system 720 can cause the virtual machine instance 722 to optionally delete an existing ML training container 730, create and initialize a new ML training container 730 using some or all of the information included in the request, and execute the code 737 stored in the new ML training container 730 to restart the machine learning model training process. As another example, the model training system 720 can cause the virtual machine instance 722 to modify the execution of code stored in an existing ML training container 730 according to the data provided in the modification request. In some embodiments, the user, via the user device 702, can transmit a request to the model training system 720 to stop the machine learning model training process. The model training system 720 can then instruct the virtual machine instance 722 to delete the ML training container 730 and/or to delete any model data stored in the training model data store 775.

As described below, in some embodiments, the model data stored in the training model data store 775 is used by the model hosting system 740 to deploy machine learning models. Alternatively or additionally, a user device 702 or another computing device (not shown) can retrieve the model data from the training model data store 775 to implement a learning algorithm in an external device. As an illustrative example, a robotic device can include sensors to capture input data. A user device 702 can retrieve the model data from the training model data store 775 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (for example, rapid initialization of machine learning model training in ML training container(s) 730) in response to training requests.

In some embodiments, the model training system 720 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model hosting system 740, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 740 includes a single physical computing device or multiple physical computing devices that are interconnected using one or more computing networks (not shown), where the physical computing device(s) host one or more virtual machine instances 742. The model hosting system 740 can handle the acquisition and configuration of compute capacity (for example, containers, instances, etc.) based on demand for the execution of trained machine learning models. The model hosting system 740 can then execute machine learning models using the compute capacity, as is described in greater detail below. The model hosting system 740 can automatically scale up and down based on the volume of execution requests received from user devices 702 via frontend 749 of the model hosting system 740, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 742 are utilized to execute tasks. For example, such tasks can include executing a machine learning model. As shown in FIG. 7, each virtual machine instance 742 includes an operating system (OS) 744, a language runtime 746, and one or more ML scoring containers 750. The ML scoring containers 750 are similar to the ML training containers 730 in that the ML scoring containers 750 are logical units created within a virtual machine instance using the resources available on that instance and can be utilized to isolate execution of a task from other processes (for example, task executions) occurring in the instance. In some embodiments, the ML scoring containers 750 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 750 (for example, creation of new files, modification of existing files, deletion of files, etc.) are stored in the top container layer. If a ML scoring container 750 is deleted, the top container layer is also deleted. However, the container image(s) that form a portion of the deleted ML scoring container 750 can remain unchanged. The ML scoring containers 750 can be implemented, for example, as Linux containers.

The ML scoring containers 750 each include a runtime 754, code 756, and dependencies 752 (for example, supporting software such as libraries) needed by the code 756 in some embodiments. The runtime 754 can be defined by one or more executable instructions that form at least a portion of a container image that is used to form the ML scoring container 750 (for example, the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines a machine learning model, which may reference dependencies 752. The code 756 can also include model data that represent characteristics of the defined machine learning model, as described in greater detail below. The runtime 754 is configured to execute the code 756 in response to an instruction to begin execution of a machine learning model. Execution of the code 756 results in the generation of outputs (for example, predicted results), as described in greater detail below.

In some embodiments, the runtime 754 is the same as the runtime 746 utilized by the virtual machine instance 742. In some embodiments, runtime 754 is different than the runtime 746 utilized by the virtual machine instance 742.

In some embodiments, the model hosting system 740 uses one or more container images included in a deployment request (or a container image retrieved from the container data store 770 in response to a received deployment request) to create and initialize a ML scoring container 750 in a virtual machine instance 742. For example, the model hosting system 740 creates a ML scoring container 750 that includes the container image(s) and/or a top container layer.

As described above, a user device 702 can submit a deployment request and/or an execution request to the model hosting system 740 via the frontend 749 in some embodiments. A deployment request causes the model hosting system 740 to deploy a trained machine learning model into a virtual machine instance 742. For example, the deployment request can include an identification of an endpoint (for example, an endpoint name, such as an HTTP endpoint name) and an identification of one or more trained machine learning models (for example, a location of one or more model data files stored in the training model data store 775). Optionally, the deployment request also includes an identification of one or more container images stored in the container data store 770.

Upon receiving the deployment request, the model hosting system 740 initializes ones or more ML scoring containers 750 in one or more hosted virtual machine instance 742. In embodiments in which the deployment request includes an identification of one or more container images, the model hosting system 740 forms the ML scoring container(s) 750 from the identified container image(s). For example, a container image identified in a deployment request can be the same container image used to form an ML training container 730 used to train the machine learning model corresponding to the deployment request. Thus, the code 756 of the ML scoring container(s) 750 includes one or more executable instructions in the container image(s) that represent an algorithm that defines a machine learning model. In embodiments in which the deployment request does not include an identification of a container image, the model hosting system 740 forms the ML scoring container(s) 750 from one or more container images stored in the container data store 770 that are appropriate for executing the identified trained machine learning model(s). For example, an appropriate container image can be a container image that includes executable instructions that represent an algorithm that defines the identified trained machine learning model(s).

The model hosting system 740 further forms the ML scoring container(s) 750 by retrieving model data corresponding to the identified trained machine learning model(s) in some embodiments. For example, the deployment request can identify a location of model data file(s) stored in the training model data store 775. In embodiments in which a single model data file is identified in the deployment request, the model hosting system 740 retrieves the identified model data file from the training model data store 775 and inserts the model data file into a single ML scoring container 750, which forms a portion of code 756. In some embodiments, the model data file is archived or compressed (for example, formed from a package of individual files). Thus, the model hosting system 740 unarchives or decompresses the model data file to obtain multiple individual files and inserts the individual files into the ML scoring container 750. In some embodiments, the model hosting system 740 stores the model data file in the same location as the location in which the model data file was stored in the ML training container 730 that generated the model data file. For example, the model data file initially was stored in the top container layer of the ML training container 730 at a certain offset, and the model hosting system 740 then stores the model data file in the top container layer of the ML scoring container 750 at the same offset.

In embodiments in which multiple model data files are identified in the deployment request, the model hosting system 740 retrieves the identified model data files from the training model data store 775. The model hosting system 740 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 740 associates the initialized ML scoring container(s) 750 with the endpoint identified in the deployment request. For example, each of the initialized ML scoring container(s) 750 can be associated with a network address. The model hosting system 740 can map the network address(es) to the identified endpoint, and the model hosting system 740 or another system (for example, a routing system, not shown) can store the mapping. Thus, a user device 702 can refer to trained machine learning model(s) stored in the ML scoring container(s) 750 using the endpoint. This allows for the network address of an ML scoring container 750 to change without causing the user operating the user device 702 to change the way in which the user refers to a trained machine learning model.

Once the ML scoring container(s) 750 are initialized, the ML scoring container(s) 750 are ready to execute trained machine learning model(s). In some embodiments, the user device 702 transmits an execution request to the model hosting system 740 via the frontend 749, where the execution request identifies an endpoint and includes an input to a machine learning model (for example, a set of input data). The model hosting system 740 or another system (for example, a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 740 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the machine learning model characteristics and the input parameters provided, execution of the executable instructions by the virtual machine instance 742 can be completed, resulting in an output.

In some embodiments, the virtual machine instance 742 stores the output in the model prediction data store 780. Alternatively or in addition, the virtual machine instance 742 transmits the output to the user device 702 that submitted the execution result via the frontend 749.

In some embodiments, the execution request corresponds to a group of related trained machine learning models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container 750, providing the received output as an input parameter to the executable instructions in the second code 756. The second ML scoring container 750 further includes a model data file stored therein, which is read by the executable instructions in the second code 756 to determine values for the characteristics defining the machine learning model. Execution of the second code 756 results in a second output. The virtual machine instance 742 that initialized the second ML scoring container 750 can then transmit the second output to the model prediction data store 780 and/or the user device 702 via the frontend 749 (for example, if no more trained machine learning models are needed to generate an output) or transmit the second output to a third ML scoring container 750 initialized in the same or different virtual machine instance 742 (for example, if outputs from one or more additional trained machine learning models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (for example, rapid initialization of ML scoring container(s) 750, rapid execution of code 756 in ML scoring container(s), etc.) in response to deployment and/or execution requests.

In some embodiments, the model hosting system 740 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model training system 720, etc.). The processing unit can also communicate to and from a memory of a virtual machine instance 742 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 720 and the model hosting system 740 depicted in FIG. 7 are not meant to be limiting. For example, the model training system 720 and/or the model hosting system 740 could also operate within a computing environment having a fewer or greater number of devices than are illustrated in FIG. 7. Thus, the depiction of the model training system 720 and/or the model hosting system 740 in FIG. 7 may be taken as illustrative and not limiting to the present disclosure. For example, the model training system 720 and/or the model hosting system 740 or various constituents thereof could implement various web services components, hosted or "cloud" computing environments, and/or peer-to-peer network configurations to implement at least a portion of the processes described herein. In some embodiments, the model training system 720 and/or the model hosting system 740 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 729 processes all training requests received from user devices 702 and provisions virtual machine instances 722. In some embodiments, the frontend 729 serves as a front door to all the other services provided by the model training system 720. The frontend 729 processes the requests and makes sure that the requests are properly authorized. For example, the frontend 729 may determine whether the user associated with the training request is authorized to initiate the training process.

Similarly, frontend 749 processes all deployment and execution requests received from user devices 702 and provisions virtual machine instances 742. In some embodiments, the frontend 749 serves as a front door to all the other services provided by the model hosting system 740. The frontend 749 processes the requests and makes sure that the requests are properly authorized. For example, the frontend 749 may determine whether the user associated with a deployment request or an execution request is authorized to access the indicated model data and/or to execute the indicated machine learning model.

The training data store 760 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 760 is depicted as being located external to the model training system 720 and the model hosting system 740, this is not meant to be limiting. For example, in some embodiments not shown, the training data store 760 is located internal to at least one of the model training system 720 or the model hosting system 740.

In some embodiments, the training metrics data store 765 stores model metrics. While the training metrics data store 765 is depicted as being located external to the model training system 720 and the model hosting system 740, this is not meant to be limiting. For example, in some embodiments not shown, the training metrics data store 765 is located internal to at least one of the model training system 720 or the model hosting system 740.

The container data store 770 stores container images, such as container images used to form ML training containers 730 and/or ML scoring containers 750, that can be retrieved by various virtual machine instances 722 and/or 742. While the container data store 770 is depicted as being located external to the model training system 720 and the model hosting system 740, this is not meant to be limiting. For example, in some embodiments not shown, the container data store 770 is located internal to at least one of the model training system 720 and the model hosting system 740.

The training model data store 775 stores model data files. In some embodiments, some of the model data files are comprised of a single file, while other model data files are packages of multiple individual files. While the training model data store 775 is depicted as being located external to the model training system 720 and the model hosting system 740, this is not meant to be limiting. For example, in some embodiments not shown, the training model data store 775 is located internal to at least one of the model training system 720 or the model hosting system 740.

The model prediction data store 780 stores outputs (for example, execution results) generated by the ML scoring containers 750 in some embodiments. While the model prediction data store 780 is depicted as being located external to the model training system 720 and the model hosting system 740, this is not meant to be limiting. For example, in some embodiments not shown, the model prediction data store 780 is located internal to at least one of the model training system 720 and the model hosting system 740.

While the model training system 720, the model hosting system 740, the training data store 760, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 702 via the one or more network(s) 106.

Various example user devices 702 are shown in FIG. 7, including a desktop computer, laptop, and a mobile phone, each provided by way of illustration. In general, the user devices 702 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 720 and/or the model hosting system 740 provides the user devices 702 with one or more user interfaces, command-line interfaces (CLI), application programing interfaces (API), and/or other programmatic interfaces for submitting training requests, deployment requests, and/or execution requests. In some embodiments, the user devices 702 can execute a stand-alone application that interacts with the model training system 720 and/or the model hosting system 740 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 8:
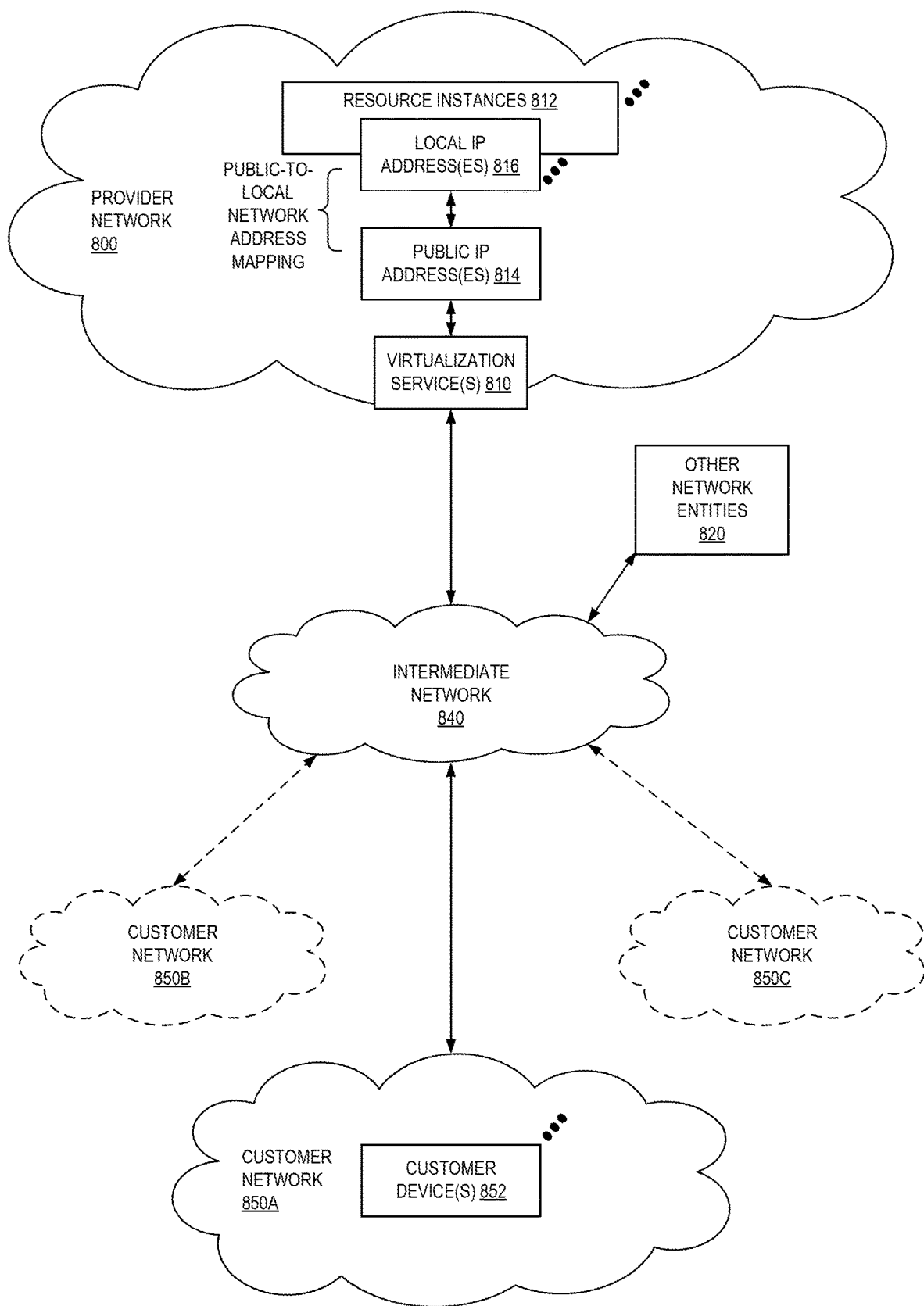
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (for example, Internet Protocol version 4 (IPv4) or Internet Protocol version 6 (IPv6) addresses) that customers may obtain from the provider 800.

Conventionally, the provider network 800, via the virtualization services 810, may allow a customer of the service provider (for example, a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
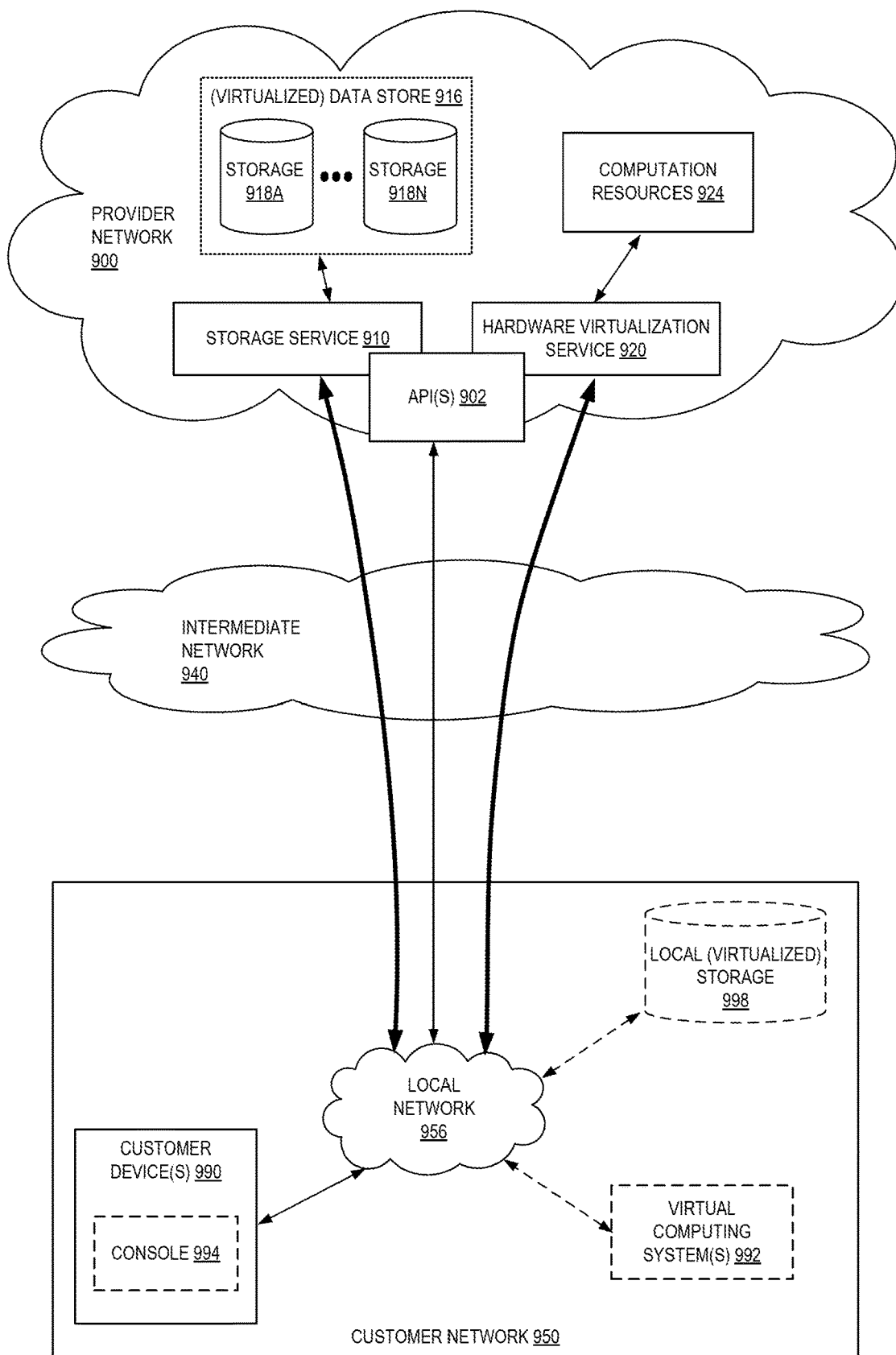
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (for example, VMs) to customers. The computation resources 924 may, for example, be rented or leased to customers of the provider network 900 (for example, to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (for example, a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (for example, via console 994), the customer may access the functionality of storage service 910, for example via one or more APIs 902, to access data from and store data to storage resources 918A-918N of a virtual data store 916 (for example, a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
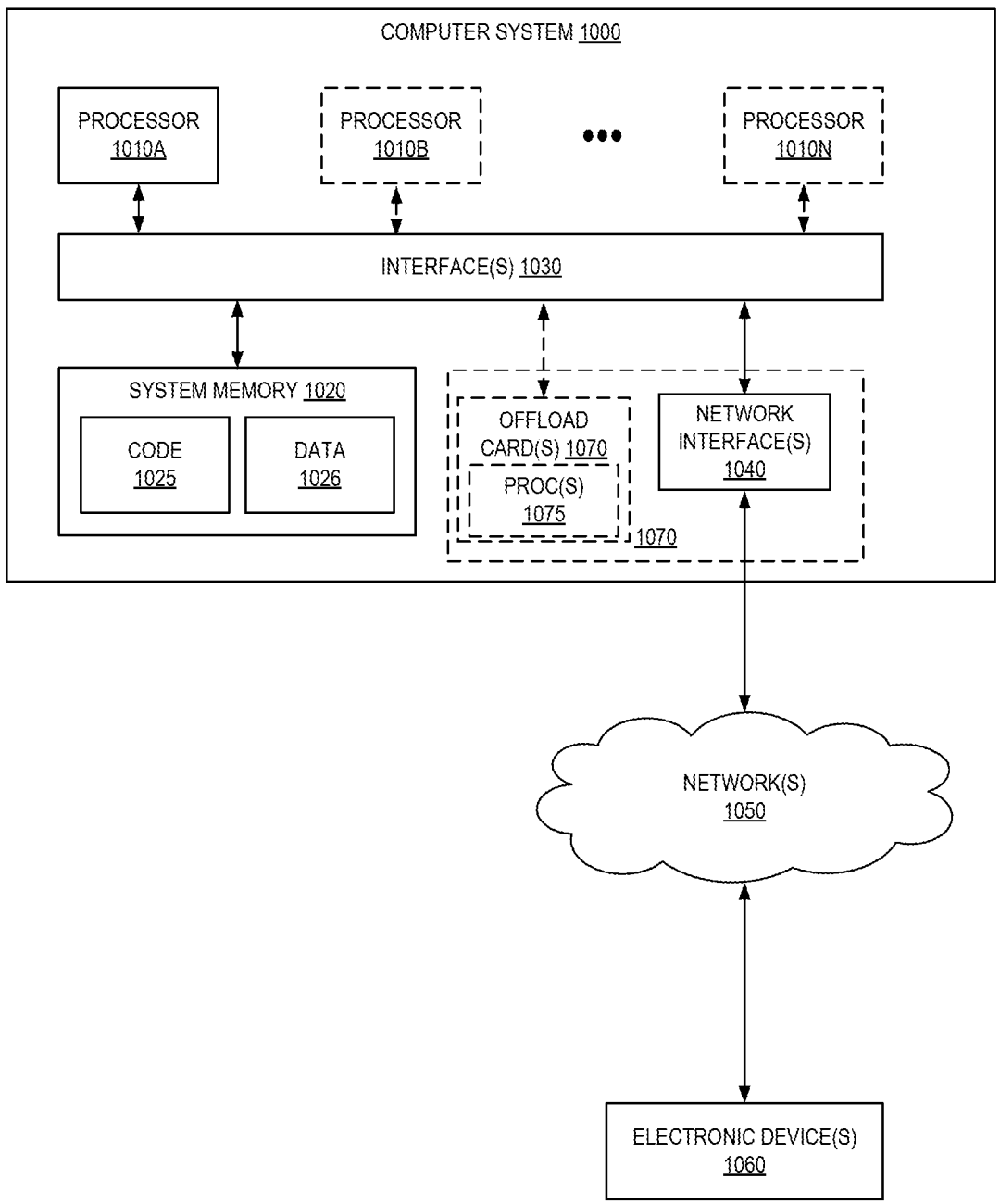
FIG. 10 is a block diagram illustrating an example computer system that may be used in some embodiments.

In some embodiments, a system that implements a portion or all of the techniques for generating time series forecasts as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (for example, two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (for example, system memory 1020) into a format suitable for use by another component (for example, processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (for example, a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (for example, operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (for example, upon a request from a hypervisor) that is executed by the other processors 1010A-1010N of the computer system 1000. However, in some embodiments the virtualization manager implemented by the offload card(s) 1070 can accommodate requests from other entities (for example, from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 1000 via I/O interface 1030. A non-transitory computer-accessible storage medium may also include any volatile or non-volatile media such as RAM (for example, SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (for example, A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, at a web service endpoint of a service provider network, a request to generate a time series forecast for a time window comprising one or more points of time;
    generating the time series forecast using a recurrent neural network (RNN) trained on time series data, wherein the RNN was trained by minimizing a continuous ranked probability score (CRPS) loss function derived from a quantile function, the quantile function defined by parameters generated by the RNN based on the time series data; and
    sending data representing the time series forecast, the time series forecast comprising a probability distribution.

2. The computer-implemented method of claim 1, wherein the request was originated by an electronic device of a user, and wherein sending the data comprising the time series forecast comprises sending the data to the electronic device.

3. The computer-implemented method of claim 1, wherein training the RNN includes, for each time series data point:
    generating a set of parameters which define a spline function; and
    using the spline function and a target value generated based on a previous time series data point to generate the CRPS.

4. A computer-implemented method comprising:
    receiving a request to generate a time series forecast for a time window comprising one or more points of time;
    generating the time series forecast using at least a recurrent neural network (RNN) trained based on time series data, wherein the RNN was trained by minimizing a continuous ranked probability score (CRPS) loss function derived from a nonparametric representation of an output distribution, the nonparametric representation of the output distribution defined by parameters generated by the RNN based on the time series data; and
    sending data comprising the time series forecast.

5. The computer-implemented method of claim 4, wherein the nonparametric representation of the output distribution is a quantile function.

6. The computer-implemented method of claim 4, wherein training the RNN includes, for each time series data point:
    generating a set of parameters which define a spline function; and
    using the spline function and a target value generated based on a previous time series data point to generate the CRPS.

7. The computer-implemented method of claim 4, further comprising:
    receiving the request to generate the time series forecast at a service endpoint of a service provider network, wherein the request was originated by an electronic device of a user; and
    wherein sending the data comprising the time series forecast comprises sending the data to the electronic device.

8. The computer-implemented method of claim 4, further comprising:
    receiving the request to generate the time series forecast at a service endpoint of a service provider network, wherein the request was originated by a service of the service provider network; and
    wherein sending the data comprising the time series forecast comprises sending the data to the service of the service provider network.

9. The computer-implemented method of claim 4, wherein the request specifies a number of parameters to be generated by the RNN based on the time series data.

10. The computer-implemented method of claim 4, wherein the parameters are generated by one of: a projection layer that performs an affine transformation of an output of the RNN, or a multilayer perceptron (MLP).

11. The computer-implemented method of claim 4, wherein the RNN is further trained based on covariate data associated with the time series data.

12. The computer-implemented method of claim 4, wherein the time series data comprises two or more separate time series, and wherein at least one of the parameters generated by the RNN is restricted to be common for the two or more separate time series.

13. The computer-implemented method of claim 4, wherein the time series data is split into windows, each window having a fixed length and including a respective conditioning range and a prediction range.

14. The computer-implemented method of claim 4, wherein generating the time series forecast further includes generating a plurality of sample paths in a prediction range.

15. A system comprising:
a front end implemented by a first one or more electronic devices of a provider network, the front end including instructions that upon execution cause the front end to:
receive a request to generate a time series forecast for a time window comprising one or more points of time; and
send the request to a forecasting service; and
the forecasting service, implemented by a second one or more electronic devices of the provider network, the forecasting service including instructions that upon execution cause the forecasting service to:
generate a time series forecast using at least a recurrent neural network (RNN) trained based on time series data, wherein the RNN was trained by minimizing a continuous ranked probability score (CRPS) loss function derived from a nonparametric representation of an output distribution, the nonparametric representation of the output distribution defined by parameters generated by the RNN based on the time series data; and
send data comprising the time series forecast.

16. The system of claim 15, wherein the nonparametric representation of the output distribution is a quantile function.

17. The system of claim 15, wherein the forecasting service includes instructions that upon execution cause the forecasting service to:
generate a set of parameters which define a spline function; and
use the spline function and a target value generated based on a previous time series data point to generate the CRPS.

18. The system of claim 15, wherein the request specifies a number of parameters to be generated by the RNN based on the time series data.

19. The system of claim 15, wherein the parameters are generated by a projection layer that performs an affine transformation of an output of the RNN.

20. The system of claim 15, wherein generating the time series forecast further includes generating a plurality of sample paths in a prediction range.

* * * * *